(No Model.)
J. B. ZIEGLER.
WATER FILTER.
No. 391,290. Patented Oct. 16, 1888.
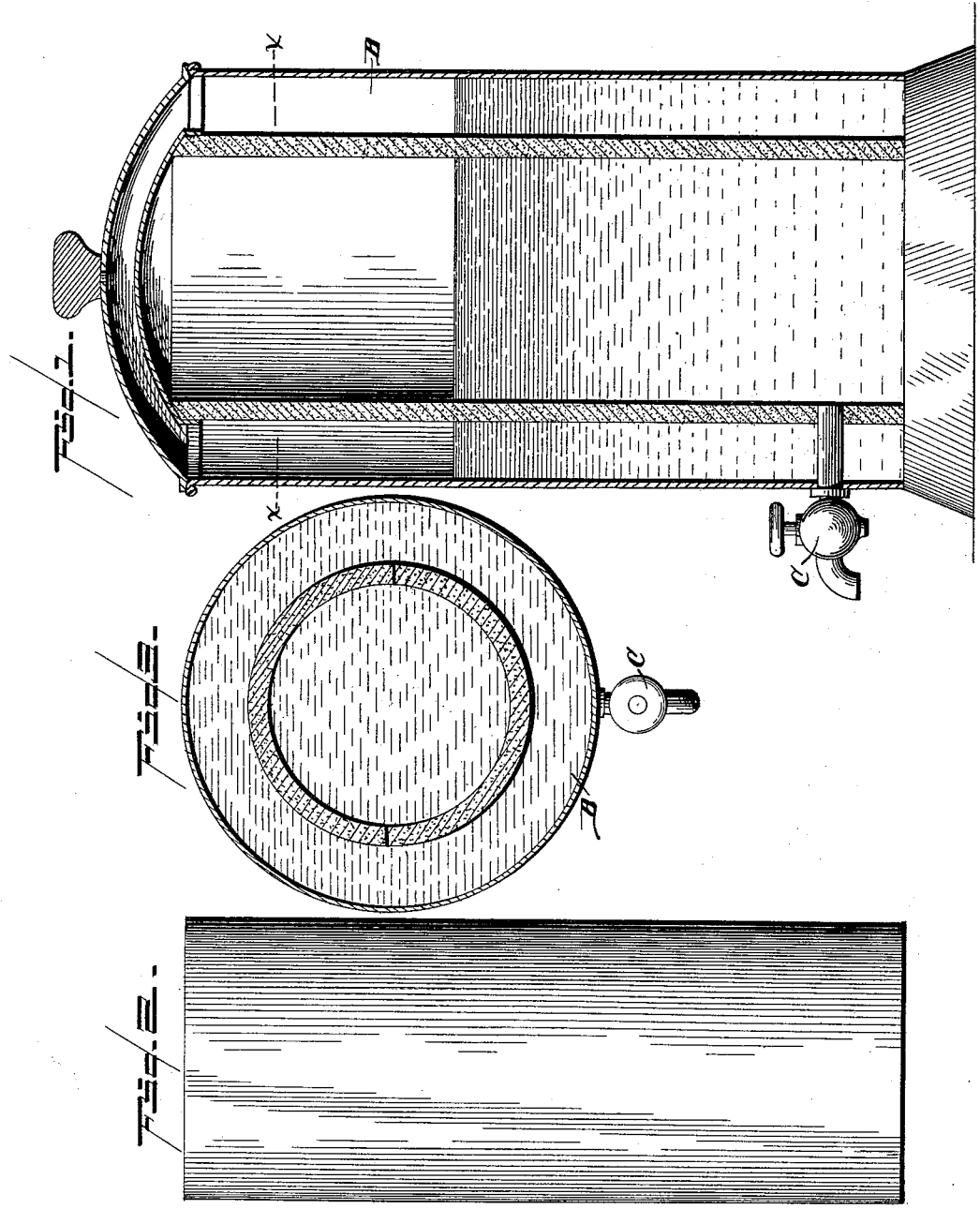
WITNESSES.
M. H. Pumphrey.
Van Buren Hillyard.
INVENTOR.
John B. Ziegler,
By R. S. & A. P. Lacey,
Attorneys.

UNITED STATES PATENT OFFICE.

JOHN B. ZIEGLER, OF AIR LINE JUNCTION, OHIO.

WATER-FILTER.

SPECIFICATION forming part of Letters Patent No. 391,290, dated October 16, 1888.

Application filed June 26, 1888. Serial No. 278,217. (No model.)

*To all whom it may concern:*

Be it known that I, JOHN B. ZIEGLER, a citizen of the United States, residing at Air Line Junction, in the county of Lucas and State of Ohio, have invented certain new and useful Improvements in Water-Filters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to filters for water, and has for its object the provision of a close-grained artificial porous stone filter for deodorizing and separating the impurities from water.

In the accompanying drawings, Figure 1 is a vertical central section of a water-cooler, showing my filter in position; Fig. 2, a side elevation of the filter; and Fig. 3, a horizontal section of the filter on the line $x$ $x$ of Fig. 1.

In constructing the filter I use the following ingredients in about the proportions specified, namely: clay, one hundred pounds; crushed pottery, seventy-five pounds; pulp, fifty pounds, (weight of pulp to be increased if faster filter is required;) feldspar, two pounds; water sufficient to make a plastic mass. These ingredients are thoroughly mixed and incorporated in a suitable mill until the mixture is of a proper consistency, when it is molded into the desired shape, and baked and burned until the pulp is entirely consumed. The cylindrical shape is preferred, as the cylinder can be placed in a vessel, as B, and the water filled in between the cylinder and the vessel. The water will percolate the filter and be purified and separated from all impurities, and can be drawn from the inside of the filter by the spigot C.

The clay must be free from lime and iron in any of their forms, and the crushed pottery must be well-burned, damaged, and ill-shaped terra-cotta, unglazed pottery, tiles, bricks, and well-calcined clay. All or any of these substances will answer for the pottery, and are crushed fine enough to pass through a No. 12 screen.

The pulp may be made from any soft wood, preferably white pine. The pulp produces pores which are almost imperceptible to the naked and keenest eye, and for this reason is far superior to sawdust, which is generally used in the construction of filtering mediums. The feldspar is a binding medium.

Having thus described my invention, what I claim, and desire to secure by Letters Patent, is—

The herein-described filtering medium, composed of clay, crushed pottery, pulp, and feldspar, in about the proportions specified.

In testimony whereof I affix my signature in presence of two witnesses.

JOHN B. ZIEGLER.

Witnesses:
O. P. BOWMAN,
J. T. BRENNER.